US005674428A

United States Patent [19]
Lott et al.

[11] Patent Number: 5,674,428
[45] Date of Patent: Oct. 7, 1997

[54] ANTI-ICING METHOD

[75] Inventors: James Arnold Lott, Maryville; David Vern Kizer, St. Joseph, both of Mo.

[73] Assignee: Kizer Industries, Inc., St. Joseph, Mo.

[21] Appl. No.: 481,806

[22] Filed: Jun. 7, 1995

Related U.S. Application Data

[62] Division of Ser. No. 410,415, Mar. 24, 1995, Pat. No. 5,591,375, Ser. No. 312,569, Sep. 26, 1994, and Ser. No. 950,934, Sep. 24, 1992, abandoned.

[51] Int. Cl.$^6$ ................................ C09K 3/18; C09K 5/00
[52] U.S. Cl. ........................ 252/70; 252/73; 106/13; 106/14.05; 106/14.11; 106/14.13; 427/221
[58] Field of Search ........................ 252/73, 74, 75, 252/70; 106/13, 14.05, 14.11, 14.13; 427/221

[56] References Cited

U.S. PATENT DOCUMENTS

| | | | |
|---|---|---|---|
| 2,101,472 | 12/1937 | Kormann | 134/27 |
| 2,436,146 | 2/1948 | Kleinicke | 252/88 |
| 4,222,740 | 9/1980 | Bohrn et al. | 8/441 |
| 4,388,203 | 6/1983 | Nimerick et al. | 252/70 |
| 4,426,409 | 1/1984 | Roe | 427/221 |
| 4,439,337 | 3/1984 | Nimerick et al. | 252/70 |
| 4,698,172 | 10/1987 | Tye et al. | 252/70 |
| 5,079,036 | 1/1992 | Roe et al. | 427/212 |
| 5,135,674 | 8/1992 | Kuhajek et al. | 252/70 |

OTHER PUBLICATIONS

*Research Disclosure*, Apr. 1985, "Aircraft De-Icer", No. 25246, p. 201.

Primary Examiner—Douglas J. McGinty
Assistant Examiner—Nechólus Ogden
Attorney, Agent, or Firm—Mitchell L. Crain

[57] ABSTRACT

A method of protecting structures and articles from environmental exposure uses a semi-permanent or temporary in situ formed film or tarp to cover the protected articles. The film is environmentally safe and biodegradable. The film also may function as a release film to protect surfaces, such as aircraft wings and refrigeration surfaces, from ice accumulation and may act as a confining barrier to control particulate materials during transportation.

18 Claims, No Drawings

1

ANTI-ICING METHOD

This application is a divisional application of application Ser. No. 07/950,934, filed Sep. 24, 1992, now abandoned; is a divisional application of application Ser. No. 08/312,569, filed Sep. 26, 1994; and is a divisional application of application Ser. No. 08/410,415, filed Mar. 24, 1995, now U.S. Pat. No. 5,591,375.

FIELD OF THE INVENTION

The invention relates to methods of protecting articles from environmental exposure, such as materials stored or transported in the open air and/or exposed to rain, ice, sun and other environmental factors. The invention also relates to methods of confining particulate and other materials using a semi-permanent or temporary protective film.

BACKGROUND OF THE INVENTION

The complications associated with the transportation and storage of materials which can freeze and clump together during the colder periods of the year has become a major commercial problem. Such materials are transported and stored primarily in open vehicles and containers, accessible to potential ice generating precipitation including rain, sleet and snow. The problem is particularly acute in transportation of coal, iron ore and other minerals in open rail cars and trucks. As the loaded cars and trucks are moved across the country, the material in the zone immediately adjacent the outer walls of the vehicles gets cold faster than the main body of material. Moisture subsequently condenses in this zone and the material begins to aggregate as the moisture freezes, acting as a cement. This condensation, coupled with the moisture from rain, sleet and snow which tends to collect adjacent to the container walls causes a defined layer of material-incorporated ice to harden adjacent to and become attached to the walls. As much as 20 percent of the material may remain frozen in the car. The purchaser of the material has ordered 100 percent and received 80 percent Furthermore, the shipper has to pay to haul that 20 percent of the material back to the mining site. If the material freezes in uneven weight distributions, which it often does, the shipper cannot move the car until they have removed the rest of the material in order to keep the cars balanced and avoid potential derailments. This wall-adhering frozen portion therefor makes material unloading difficult through the normal automated procedures and requires people with chipping tools to enter the partially unloaded containers to manually remove the remaining iced layer stuck on the walls.

A problem also arises when moisture leaches corrosive compounds from the contained particulate materials, even at temperatures at and below freezing. Storage containers and vehicles such as railcars and truck beds are made of iron containing metals which, tend to rust and corrode excessively because of this corrosive moisture in contact with the walls. This corrosive action thereby shortens the expected lifetime of such containers and vehicles.

Other problems arise in transporting particulate material, including coal, gravel, refuse and the like in open vehicles. Often dust and particulates are blown and bounced out of the containing vehicle and create a hazard to following traffic and an eyesore on the roadway. In addition, transported and stored materials, such as structural steel, machines and machine components may corrode and degrade when subjected to the elements by being stored or transported in the open air. Rain, sunlight, salt spray, pollution and other environmental factors can attack unprotected structures. Containers, tarps and other protective coverings of a permanent nature have been used, to protect structures, but these methods are expensive, use bulky objects requiring storage and which also must be disposed of when no longer in use. Disposal of old tarps, containers and structures also creates an environmental problem. These articles are unsightly, occupy landfill space, or require other expensive or environmentally intrusive disposal.

The compositions of this invention are also useful in de-icing and protecting external aircraft components from freezing during the period of time surrounding take-off. Other structures may also be protected from ice accumulation. During severe cold weather conditions, the wings and body portions of aircraft will become coated with ice, sleet and snow and such build-up must be removed from the aircraft prior to take-off. In fact, plane crashes have occurred because the build-up was sufficient to prevent the aircraft from gaining proper altitude after take-off. Various systems are presently used to prevent such build-ups and to remove layers of ice, sleet and snow immediately prior to take-off. However, no completely satisfactory system has been developed.

The prior art details several attempts at correcting these problems. Some inventors have attempted to correct the problems only after the particulate material is already frozen to the container walls. U.S. Pat. No. 4,388,203 discloses compositions and methods for melting already frozen material by applying de-icing compositions to the surface of particulate materials such as coal. These compositions also may be used on frozen surfaces such as rail cars to thaw accumulated frozen water. This is inefficient as one would have to wait for each container of material to thaw at every transfer point before unloading and use.

Other inventors have treated the materials themselves prior to loading into the vehicles storage containers. U.S. Pat. No. 4,426,409 discloses freeze protection polymer-systems for use in spraying particles such as coal to reduce the cohesive strength of such particles. U.S. Pat. No. 5,079, 036 discloses a brine freeze control, agent which is applied to particulate materials such as coal or mineral ores to inhibit freezing aggregation. This is uneconomical when one considers the millions of tons of such materials shipped every year and the additional cost involved in treating the necessary materials.

A few inventors have attempted to solve the problem through preventative treatment of the containers prior to the addition of the particulate material. In Nimerick U.S. Pat. No. 4,439,337, a viscous mixture is applied to the metal surface before loading of the materials in order to freeze proof those surfaces. Other attempts have been made to control and inhibit the freeze agglomeration of particulate materials during transportation and all such attempts have limitations ranging from difficulty of application to low cost-performance ratios. Many of these solutions contain ethylene glycol, sodium chloride and other substances which require special disposal methods or adversely affect the environment. The aircraft anti-icing fluid in U.S. Pat. No. 4,698,172 is an ethylene glycol solution thickened with gel forming carrageenans.

SUMMARY OF THE INVENTION

This invention relates to environmentally responsible antifreeze multi-component compositions which are combined substantially simultaneous with their application to the target surfaces. This invention further relates to methods of using and modifying such compounds to protect structures from the surrounding environment. The use of environmentally detrimental materials such as ethylene glycol and alkaline earth halides are avoided and instead, biodegradable ingredients are utilized. More specifically, component part A is a mixture which includes some percentage of polysaccharides which contain acidic functional groups, and gelatinous materials in at least one solvent while component part B contains polyvalent cations and at least one solvent.

Part A and part B are kept separate until the time for application, at which time part A and part B are sprayed, preferably sequentially, and upon mutual contact produce a gel which adheres to the surface and reacts to form an antifreeze film. Other known methods of application, such as painting, may be used.

Other elements such as surfactants and non-reactive diluents are added to meet a particular utilization requirement. Of particular importance, a dye in the coating mixture provides a more visible product. Also, an additive can be incorporated into the antifreeze composition to neutralize the corrosive agents released by some materials. Uses for the tailored compositions of this invention include coating the inside of railroad cars, trucks, and vessels used for the transportation and storage of particulate materials. Further, transported and stored articles may be protected by forming in situ coverings, biodegradable and disposable tarps, and protective wraps. The coverings may be safely disposed of without any substantial impact on the environment.

Uses for the compositions of this invention also include coating various structures to prevent or facilitate removal of ice accumulation on structures, such as refrigeration surfaces and also including treating aircraft parts, such as wings, to prevent or remove icing while the plane awaits take-off. At take-off, the composition which may contain a release agent, will quickly sluff off the treated parts of the aircraft. A dye added to the composition enables the pilot to more quickly inspect aircraft icing conditions prior to and during take-off.

It is an object of this invention to provide a method of preventing ice accumulation on exposed surfaces.

It is a further object of this invention to provide a method permitting ready removal of ice accumulation from surfaces.

It is a further object of the invention to provide a method of protecting exposed structures from environmental harm.

It is a further object of the invention to provide a method of containing particulate materials.

It is a further object of the invention to provide a method of forming a protective film in situ over exposed structures and articles.

It is a further object of the invention to provide a method of forming in situ a disposable and environmentally safe protective film over exposed structures and articles.

It is a further object of the invention to provide a method of forming in situ semi-permanent or temporary protective films.

It is a further object of the invention to provide a method of forming inexpensive semi-permanent or temporary protective films for structures and articles.

DETAILED DESCRIPTION OF THE INVENTION

The invention relates to environmentally preferred multi-part antifreeze compositions applied in an innovative, rapid and economical manner, to particulate material transporting devices such as railroad cars, trucks, barges, wheel barrows and conveyor belts, as well as storage containers. These biodegradable and nontoxic antifreeze compositions assist in particulate material removal at and below freezing temperatures by preventing the formation of high strength ice crystals between the contained material and the walls of the devices.

The accumulation of ice on aircraft while awaiting take-off is a safety hazard. The decision to take-off under icing conditions has been left to the discretion of the pilot. Unfortunately, the pilot's main method of making that decision has been through personal inspection which has been often flawed. This invention involves a method of preventing-ice build-up over longer periods of time and assists the pilot in the decision to take-off or reapply the anti-icing treatment by providing a visual means-of determining if ice build-up is a problem. The invention also may be used to facilitate removal of an ice accumulation already on the aircraft or from other structures exposed to ice accumulation.

Antifreeze Formulations

The compositions of this invention are used to coat the sides of railroad cars and other vehicles or containers prior to the introduction of particulate material, to prevent ice bonding the material to the vessel surfaces. Initially the several parts of the composition are applied onto the sides of a railroad car, for example. When the two component parts react and cure, they form a thin gel film, the properties of which can be formulated to range from water soluble to water insoluble by controlling the amount of crosslinking of the component elements. The gel film prevents ice from adhering to the vessel surfaces because the film behaves as an antifreeze, preventing any water in contact with the film from forming ice crystals. In addition, the texture of the coating prevents any ice crystals that do form from achieving a strong physical bond with the more porous metal surface. Although ice might still form and bond with the film, the bond between the ice containing material and the film will not have sufficient tensile strength to prevent the material from routinely falling from the vessel when the vessel is unloaded under normal procedures. The film may be coated over the exposed surface of the loaded particulate material to prevent intrusion of water into the load and to prevent dusting and loss of particulate material from the load.

The antifreeze compositions include multiple components which are separately applied to the surface. Individual component parts are preferably kept separate before their application because the rapid reaction between the components results in a semi-solid composition which cannot be applied in an easy manner by a single head standard spray apparatus.

The preferred antifreeze composition employs a two part multi-component system. The combination of part A and part B forms a novel composition with substantially improved characteristics over those of either individual part. Part A includes at least one polysaccharide which contains acid functional groups and a gelatinous material dissolved in at least one solvent. Part A is a thick and viscous, semi-fluid gel, especially at low temperatures, and by itself has antifreeze properties which prevents the formation of ice crystals. The gels of this invention have a freezing point dictated by the amount of water-soluble organic compounds included in part A and part B, but preferably the gel will have a freezing point of nearly minus 40 -degrees- Fahrenheit. The final gel strength is dictated by the type and quantity of gelatin dissolved in part A.

The greater the percentage of gelatin, the greater the gel strength and the higher the temperature at which the mixture will completely set-up. Gelatin reduces the vapor pressure of the composition formed and causes it to remain pliable for a longer period of time. Gelatin is also impervious to all but the strongest of acids. This is desirable because the strong acids eluted from some particulate materials could react with some of the polyvalent cations included in the antifreeze composition and reduce the strength of the gel film. The polysaccharides which contain acid functional groups useful in this invention include, singly or a combination thereof, cellulosic materials such as cellulose gum (carboxymethyl cellulose) and cation salts thereof, including sodium, potassium, and ammonium salts; polyuronic acids such as soluble alginic acid salts, pectins and cation salts thereof, including sodium, potassium, and ammonium salts; and modified starches such as oxidized starches and carboxylated starches, and cation salts thereof, including sodium, potassium, and ammonium salts. These biodegradable materials pose no known environmental problems. Gelatinous materials include gelatin, collagen, and salts thereof or a mixture of such materials. Materials such as these proteins are rapidly degraded by environmental forces.

The polysaccharides which contain acid functional groups are effective at levels ranging between about 0.1 percent to about 20 percent by weight but preferably between about 0.1 percent to about 10 percent by weight. The gelatinous material is added in the range of about 0.5 percent to about 20 percent by weight and the preferred range is between about 0.5 percent and about 12 percent by weight.

Part A may be further modified by buffers and various gums and modified gums, such as guar gum, locust bean gum, xanthan gum, modified quar gum, and the like, to impart varying properties to the resulting film. Various plasticizers, humectants and toughening agents may also be included, such as vinyl or other modified polymers.

Part A is generally dispersed in at least one solvent, preferably water or organic glycols with low toxicity such as propylene glycol, glycerin, or a plurality of such compounds. The solvent of part A ranges between about 60 percent and about 99 percent by weight, where the water amount ranges between about 20 percent and 99 percent by weight and the organic element is preferably between about 0.1 percent and about 50 per cent by weight. Organic glycols, such as propylene glycol and glycerin, when used, also have a plasticizing or elasticizing effect on the film. Other known plasticizers, humectants and elasticizers may also be used.

Part B contains gel stabilizing water soluble polyvalent cation salts in a solvent. The gel stabilizing polyvalent cation salts include, for example, salts of aluminum, calcium, iron, tin, chromium, and zinc, including aluminum nitrate nonahydrate $Al(NO_3)_3 \cdot 9H_2O$, calcium acetate $(Ca(OAc)_2)$, calcium citrate, and ferric chloride hexahydrate $(Fe\ Cl_3 \cdot 6H_2O$.

The solvent in part B is in part water or an organic glycol with low toxicity such as propylene glycol, glycerin, alkoxytriglycols, alkoxydiglycols or hydroxyethyl pyrrolidone, and also contributes antifreeze properties to the finished film.

The polyvalent cation concentration should range between about 0.001 percent and about 20 to 30 percent by weight and preferably between about 0.006 percent and approximately 15 per cent by weight. The water portion of the solvent ranges between approximately 20 percent and about 99 percent by weight, whereas the organic element ranges between about 1 percent and approximately 50 percent by weight.

The antifreeze compositions include single elements or a plurality of elements, such as a plurality of polysaccharides which contain acid functional groups or a plurality of polyvalent cation salts. Different polysaccharides which contain acid functional groups form gels with different properties when they contact polyvalent cations. A film containing cellulosic material is a very smooth, even textured gel whereas alginic acid containing gels provide a more rigid uneven gel, though much sturdier than a cellulose containing gel. Therefore, applications may require a mixture of such acid containing polysaccharides to produce the required consistency. Similarly, different polyvalent metal cations salts have different gel stabilizing properties and different costs, so often a combination of such salts best form the properties needed for a particular antifreeze composition gel application.

The two parts are applied in the following general method. In the preferred practice, part A and part B are preferably placed in individual high pressure spray units and sprayed under pressure to form a gel film surface layer adjacent to and adhering to the surface of all craft components. Preferably the separate components are applied with sprayers but mechanical methods of application including brushes, rollers, or spreaders, alone or in conjunction with spraying, can be utilized to apply some portion of the composition. Part A and part B are placed in separate carboys connected to separate Powermate Pressure Wash, Model PW70-1200, pressure spray units from Coleman Powermate, Inc., Kearney, Neb. The original spray wands are replaced with a piece of steel pipe to which a nozzle body and a flat spray tip (Model #730308, Spray System Co., Wheaton, Ill.) are secured via a nozzle cap. The carboys are placed higher than the sprayers to prime and gravity feed the two units. The two spray wands are secured by clamps to a length of 1"×4" board to hold them securely about 4 inches apart. The two spray tips are aligned parallel to each other so the nozzle orifices are aligned vertical to the ground. The supported spray wands are held approximately four feet from the surface to be sprayed and produce a spray covering about a four foot wide area. The pumps of the spray units are activated and the solutions are released in a flat, fan-shaped fine spray mist. The spray heads are moved in a horizontal motion to apply the compounds in such a manner that part A is preferably applied slightly before part B in these antifreeze compositions so that part A's gelatin formulation initially retains the acid containing polysaccharides on the vessel walls for reaction with the cross linking polyvalent cations in part B to form a uniform gel on the surface. The spray unit pressures used depend on the viscosity of part A and part B, and range from approximately 40 psi to approximately 1200 psi, 250 psi to 350 psi is best, but about 300 psi is preferred. The effective flow rate range of part A is between about 0.2 gallon per minute and about 1.75 gallon per minute but the preferred rate is about 0.5 gallon per minute. The flow rate range for spraying part B is between about 0.1 gallon per minute and about 1.8 gallon per minute with the preferred rate being about 0.2 gallon per minute. The wands are moved to apply a uniform layer of antifreeze ranging between about 1/1000 inch and about 1/4 inch with the preferred range being about 1/32 inch and about 1/8 inch thick.

Alternatively, the components are mixed in a single spray mixing nozzle substantially immediately prior to the outlet orifice so the mixing is improved. The pressurized spray method of application, in addition to the beneficial ease, speed and low cost properties, also produces a beneficial air rich environment which assists oxidation of any reduced metal to higher valency forms for improved reactions with the polysaccharides.

Gelatin, in combination with cellulose gum, pectin, alginic acid and other polysaccharides, prevents the strong adhesion of frozen material to the walls of a vessel, allowing easy material removal even in freezing conditions. The invention in the form of a thin water insoluble gel will be resistant to absorption by the material being transported. The water insolubility of the gel also ensures that rain, sleet and snow which might enter the container will not rinse the coating off the walls of the container or render it ineffective for its intended protective antifreeze purpose. The gelatin containing solution should be constantly agitated prior to being applied to ensure the solution does not gel in the bottom of the container. Although some gel may form during long term storage prior to application, the gel is dispersed upon subsequent heating and stirring.

The polyvalent metal salts in part B are also critical to the formation of the gels. The polyvalent metal cation salts react with the high molecular weight polysaccharides and proteins in part A and become intertwined, resulting in a strong gel layer. Higher concentrations of such inorganic salts rapidly form firmer, more water insoluble gels. Iron (III) appears to be the best all around polyvalent ion for this application. Al (III) tends to be cost prohibitive, and Ca (II), although cost effective, does not yield as strong a gel as the others. Specifically, calcium ion cause a gel to form initially, but an excess weakens the gel formed and causes it to liquify, so the use of excess calcium should be avoided for best results. Other metal ions are either cost prohibitive or have adverse environmental and health effects associated with their use.

Each of the components, part A and part B may contain specific additives which will be included based on the ultimate utilization of the invention's compositions. For example, surfactants, such as anionic surfactant sodium lauryl sulfate, may be utilized to decrease the surface tension of the solution to promote bubble formation in the resulting gel film.

The following examples further illustrate the invention but are not to be construed as a limitation on the scope of the invention. Example 1 details the specific component elements and procedure for producing a composition useful in protecting the surfaces of particulate material storage and transportation vessels, such as rail cars. All percentages are calculated on a weight percent basis.

Example 1

| Part A | Part B |
| --- | --- |
| .5% cellulose gum | 5% ferric chloride |
| .5% alginic acid (soluble salt) | 50% propylene glycol |
| 2% gelatin | 45% water |
| 47% water | |
| 50% propylene glycol | |

The weight of water equal to about ⅕ the calculated final weight was heated to boiling and the predetermined mass of gelatin (275 bloom, Dynagel, Inc., Calumet City, Ill.) was dissolved in this solution. The solution was stirred for three minutes after complete dissolution was apparent. The solution, while still warm, was diluted with the remaining water. The solution was vigorously agitated using a device which created a vortex into which the cellulose gum (7H, Aqualon Co., Wilmington, Del.) was gradually introduced. There was a dramatic increase in the viscosity noted during this procedure. A predetermined amount of alginic acid (heavy viscosity grade, Meer Corp., North Bergen, N.J.) was introduced into the solution, noting the conditions encountered dissolving the cellulose gum. The solution appeared clear, but not necessarily colorless due to the nature of the compounds being dissolved. The remaining quantity of propylene glycol (Eastman Chemical, Kingsport, Tenn.) was added to the vigorously stirred solution until the solution was homogeneous.

Part B was prepared by measuring out the appropriate amount of ferric chloride hexahydrate and dissolving it in water. The quantity of the polyvalent metal salt should be no less than about 1/16 the weight of the combined polysaccharides used in part A. The water soluble antifreeze, propylene glycol, was then added and the solution was stirred vigorously for approximately twenty minutes to ensure complete and homogeneous distribution of the polyvalent metal ion.

Part A was placed in a container which gravity fed into a high pressure spraying machine (Coleman Powermate, Inc. model PW70-1200> capable of providing at least about 100 psi at the nozzle, and the pump was primed. Part B was then placed in a second container which gravity fed into a second similar high pressure spray unit also capable of providing no less than about 100 psi at the nozzle, and that pump was also primed.

The spray wands of the two spray units were aligned parallel to each other so the nozzles were vertical to the ground. The supported spray wands were held approximately four feet from the surface to be sprayed to produce about a four foot wide spray. The pumps of the spray units were activated substantially simultaneously and the solutions were released in a flat, fan-shaped fine spray mist. The pressures used depended on the viscosities of part A and part B, but about 300 psi was preferred. The spray heads were moved in a horizontal motion to apply the compounds in such a manner that part A was applied to the surface first and part B was substantially immediately applied to part A, allowing the two components to mix and react to form a uniform gel. The preferred flow rate of part A was about 0.5 gallon per minute. The preferred flow rate for spraying part B was about 0.2 gallon per minute. The wands were evenly moved to apply a uniform layer of antifreeze between about 1/32 inch and about 1/8 inch thick.

Part A and part B reacted to form a gel which adhered to the surface to which it was applied. Upon setting for a short period of time the gel developed greater strength, became less fluid and more rigid. A gel with sufficient strength developed after about twenty minutes.

Antifreeze and Corrosion Control-Two Component System

A problem arises during the freeze-thaw weather patterns experienced during the transportation and storage of particulate materials, such as coal and mineral ores. Moisture leaches compounds out of the materials, causing an adverse corrosion related degradation of the vessels. Storage containers and vehicles such as railcars and truck beds are made of iron containing metals which tend to rust and corrode excessively on contact with these corrosive compounds. This corrosive action thereby shortens the expected lifetime of such containers and vehicles. The problem is well known and many unsuccessful attempts have been made to alleviate it. A corrosion control agent is incorporated into the antifreeze formulation of this invention not only to aid in the unloading of the vessels but also reduce the corrosion caused by corrosive substances eluted from the particulate materials.

A two component system which forms a water insoluble, non-toxic, biodegradable film or gel containing a corrosion control agent homogeneously distributed throughout, prevents the corrosion which reduces the life of railroad cars and other devices used to transport, and store potentially corrosive particulate materials.

Possible corrosion control agents include calcium carbonate, dolomite, magnesium carbonate and other insoluble metal compounds which are able to neutralize corrosive acids, yet are environmentally compatible with the intended use of the contained material. The presence of calcium compounds as corrosion control agents does not weaken the resulting antifreeze gels as soluble calcium salts do when used in similar amounts as a polyvalent cation source, because these agents are water insoluble and do not interact with the gel-forming mixture.

The spray unit pressures will depend on the viscosity of part A and part B, and range from approximately 40 psi to approximately 1200 psi, 250 psi to 350 psi is best, but about 300 psi is preferred. The effective flow rate range of part A is held to be about twice that of part B because of the desired concentration of the two parts and ranged between about 0.25 gallon per minute and about 1.75 gallon per minute, but the preferred rate is about 0.5 gallon per minute. The flow rate range for spraying part B is between about 0.1 gallon per minute and about 1.8 gallons per minute with the preferred rate being about 0.2 gallon per minute. The spray wands are moved to apply a uniform layer of antifreeze ranging between about 1/1000 inch and about 1/4 inch with the preferred range being between about 1/32 inch and about 1/8 inch thick.

The resulting gel film is impervious to all but the strongest of acids. This is desirable because the strong corrosive acids eluted from the transported material can react with the polyvalent cation to weaken the gel film. Even if some gel film deterioration occurs, the exposed-portion of the gel layer provides for additional corrosion control agent to neutralize the excess corrosive-material, thereby-arresting further deterioration.

Corrosion control agents such as dolomite can be added to either or both part A and part B although it is not soluble in either. The corrosion control agents are included in the range between about 10 percent and about 50 percent and preferably between about 15 percent and 30 percent. Other corrosion inhibitors such as antioxidants, for example BHT, BHA and ascorbic acid, and equivalent inhibitors may be added where the particular application protects structures or articles susceptible to oxidation. Ultra violet light inhibitors and blockers, including carbon black and equivalent inhibitors may be added, especially where longer term outdoor exposure is contemplated.

Gelatinous materials are also added to either or both parts so that when the gel is formed by the initial reaction the gelatin could begin to set and form a more rigid film. Agitation is required during mixing and application to maintain the gelatin and corrosion control agent in solution. If the gelatin does gel during periods of inactivity, the gel can be reversibly brought back into solution by heating the gel over its melting temperature while agitating the solution.

The water insoluble nature of this gel, resulting from the gelatinous material composition and the curing from the polyvalent metal cations, serves two functions. The layer will not be easily washed off by precipitation, nor will corrosive acids rapidly penetrate it to attack the metal walls of the treated vessel.

A mixture of individual polysaccharides which contain acid functional groups can be used in part A to modify the gel properties. A preservative may be used in part A, e.g 1% propylene glycol, to prevent attack by bacteria and mold if polysaccharides other than cellulosic materials are used. Other known preservatives may be used, such as proprionic acid, and salts thereof, copper sulfate, and other fungistats, fungicides and bactericides.

A specific formulation and procedure for application is included in Example 2 below. The percentages are based on a total weight basis.

Example 2

| Part A | Part B |
|---|---|
| .5% cellulose gum | 5% ferric chloride |
| .5% alginic acid (soluble salt) | 47% water |
| 1% gelatin | 48% propylene glycol |
| 34% water | |
| 34% propylene glycol | |
| 30% dolomite powder | |
| less than 1% dye | |

Part A was prepared by first determining the weight of the total solution to be prepared. Water equal to about 1/3 the total weight was heated to boiling and the predetermined mass of gelatin was dissolved in this solution. The solution was stirred for three minutes after complete dissolution is apparent. The solution was vigorously agitated by using a device which created a vortex into which cellulose gum was gradually introduced. There was a dramatic increase in the viscosity noted during this procedure. A predetermined amount of alginic acid was introduced into the solution, noting the conditions maintained for the cellulose gum. The dye was introduced and the solution stirred vigorously for a period of no less than about one hour to ensure the complete dissolution of the solutes. At the end of this time the solution appeared clear, but not necessarily colorless. The dolomite powder was introduced to this solution slowly to ensure it did not lump and remained present in solution in the same consistency as when first introduced. The propylene glycol was slowly added and the solution was stirred for about an additional 20 minutes to ensure homogeneity. The resulting solution was stored after vigorous agitation.

Part B was prepared by dissolving the appropriate amount of ferric chloride hexahydrate in water. The propylene glycol was added and the solution was stirred for approximately 20 minutes. This solution was stored until ready for use.

The composition components were applied through an apparatus similar to that used in Example 1. Part A was placed in a five gallon carboy and raised about two feet above the spraying mechanism to gravity feed the high pressure spray unit. The pump was primed and turned off. A magnetic stirrer (Corning model PC-310) in the carboy as a means of agitation was provided to ensure the dolomite and gelatin were homogeneous throughout the system and did not accumulate or gel in the bottom of the container.

Part B was similarly hooked to gravity feed a second high pressure spray unit, but no agitation means were needed since no dolomite was present in part B.

The spray wand of each unit was snapped into a holder keeping them approximately 4 inches apart. The units were energized substantially simultaneously and the combined wand unit was moved in a horizontal motion over the surface, starting at the top of the surface. The distance from the surface to be covered was dictated by the pressure and design of the spray. The usual distance was between 3 feet to about 4 feet from the surface. This allowed the solution to mix and react on the surface.

Part A was applied at about 0.5 gallon per minute under approximately 300 psi pressure and part B was applied about at 0.25 gallon per minute under a similar pressure.

The dolomite was suspended in the viscous part A until it reacted with part B at the surface to form the gel film. Any dolomite in part A was evenly distributed at the surface and ready to react with any corrosive acids eluting from the material being carried.

A simulation of the effect of a corrosive leachate on the above prepared antifreeze gel containing a corrosion control agent was performed. A solution of 1 molar sulfuric acid was applied to portions of the prepared antifreeze composition gel. The sulfuric acid did not appear to affect the texture or consistency of the gel film formed through the reaction of part A and part B. The acid did not appear to dissolve any of the gel, but a small amount of effervescence was evident as the surface corrosion control agent neutralized the acid, emitting carbon dioxide in the process.

The insoluble nature of the antifreeze gel in both water and dilute acids, plus the dolomite's reaction with any eluted acid was very effective in reducing a previously bothersome and costly corrosion problem.

Aircraft and Surface Antifreeze and De-icing System

This invention also includes a method of protecting aircraft from the effects of moisture condensing on the lifting surfaces, as well as protecting numerous surfaces from ice accumulation, such as, during periods of freezing rain, snow and sleet. Specifically, the antifreeze composition prepared for protection of vessel surfaces can be also applied to aircraft as antifreeze protection during foul weather. In addition, this system employs a visible dye to assist the pilot in determining if the plane is suitable for take-off or will require additional de-icing. This visual aid, utilizing commercially available dyes, such as commonly used food colorings, are capable of being observed, even when dark to assist the pilot in determining the air worthiness of his plane. Other useful commercially available dyes include, natural dyes and synthetic-dyes capable of imparting easily visible color to the antifreeze compositions.

These antifreeze films are prepared similar to that described for the particulate material vessel antifreeze coating compositions described above. These films present a slippery hard antifreeze surface which has a tendency to repel water and ice. In addition, the polysaccharides which contain acid function groups are not susceptible to freezing and will inhibit ice crystals from forming. Also, the propylene glycol is mixed in and suspended throughout the gel, presenting additional antifreeze elements in a slow time release manner. Any precipitation or condensation that hits the gel on the surface of the aircraft will partially dissolve the gel film, forming a propylene glycol/water mixture which also serves as an antifreeze.

The use of a dye in the gel composition provides art added safety factor, although the visibility of the layer itself may be sufficient. Both the pilot and the ground crew will be in a position to quickly inspect and judge whether they had adequate anti-icing protection prior to take-off. If the plane has been on the ground long enough for the gel to dissolve and dissipate, it will be visually apparent through the lack of color. FAA regulations leave the issue of additional applications of de-icer up to the discretion of the pilot. This dye component will be an added safety feature for all concerned. It is detectable using ultraviolet light methods to aid in inspection during the night.

The composition will be applied with modified spray units (Powermate Pressure Wash, Coleman, Powermate,. Inc., Kearney, Neb.) identical to that cited above. Part A and part B solutions are placed in carboys and placed above the spraying unit to gravity feed the sprayers. The polyvalent cations form a stabilized, more water resistant layer than found with the foam composition in Example 3.

A water insoluble surfactant, such as dipropylene glycol monobutyl ether (butyl Dipropasol solvent from Union Carbide), additionally prevents moisture from penetrating to the wing surface. Other known commercially available surfactants will work in this invention. The surfactants also act as release agents, encouraging the gel to slide off the wings during take-off. If one is unsure about its ability to shear during take-off, alternatively it can be physically removed such as by using high pressure air prior to take-off.

Alternatively, the invention includes an antifreeze and de-icer foam composition intended for use as an aircraft de-icer that produces a thick water soluble foam, unlike the previously detailed gel formed with polyvalent metal cation cross linking. In addition, this foam composition includes significant differences in the method of applying the parts to the aircraft surfaces.

The multi-component compositions include part A consisting of polysaccharides which contain acid functional groups, gelatinous materials and surfactants dissolved in a solvent system. Part B consists of an antifreeze solution consisting mainly of hydroxy containing organic compounds and a food color dye.

The polysaccharides which contain acid functional groups useful in this invention include, singly or a combination thereof, cellulosic materials such as cellulose gum (carboxymethyl cellulose) and cation salts thereof, including sodium, potassium, and ammonium salts; polyuronic acids such as alginic acid, pectins, and cation salts thereof, including sodium, potassium, and ammonium salts; and modified starches such as oxidized starches and carboxylated starches, and cation salts thereof, including sodium, potassium, and ammonium salts. These biodegradable materials pose no known environmental problems.

Part A is generally dispersed in at least one solvent, preferably water and organic glycols with low toxicity, such as propylene glycol.

Gelatinous materials include gelatin, collagen, and salts thereof, or a mixture of such materials. Materials such as these proteins are rapidly degraded by environmental forces.

The polysaccharides which contain acid functional groups are included in the range between about 0.1 percent and about 10 per cent but preferably between approximately 0.5 percent and about 2 percent. The gelatin component is added in the range of about 5 percent and approximately 20 percent and the preferred range is approximately 0.5 percent and about 4 percent. The surfactant ranges between about 0.5 percent and about 20 percent and preferably between approximately 0.5 percent and approximately 4 percent. The solvent for part A includes a plurality of compounds in the range of about 50 percent and about 99 percent where the water component varies between about 25 percent and approximately 50 percent and the organic component is preferably between about 25 percent and about 50 percent.

Part B is simply a solvent that has about 1% food color dye dissolved in it. The solvent in part B is water, an organic glycol with low toxicity such as propylene glycol, glycerin, alkoxytriglycols, alkoxydiglycols or hydroxyethyl pyrrolidone,. or an aqueous mixture of such organic solvents.

The components are applied to the aircraft in a different manner than previously disclosed for the aircraft antifreeze gel. The composition is applied with modified Powermate Pressure Wash spray units (Coleman Powermate, Inc., Kearney, Neb.). Part A and part B solutions are placed in carboys and placed above the spraying unit to gravity feed the sprayers. Unlike the spraying method utilized above, part B is applied prior to part A. Part B is simply attached to a high pressure unit which will disperse the mixture in a fine mist to uniformly cover the lifting surfaces of the plane to be covered. Thus the propylene glycol antifreeze of part B initially coats the plane immediately prior to foamed part A. The application of component part A also varies from that previously described in that higher pressures, e.g. up to 1200 psi, and spray rates, e.g. 1.75 gallon per minute, are preferred. In addition, the spray from the part A wand is directed through a screen held in front of the spray tip to produce a fine bubble foam. Alternatively, a commercially available foaming machine would generate an even finer bubbled foam.

The foam is applied to the wings in a thickness range between approximately one half inch and about six inches, but a thickness range between about one inch and approximately two inches is generally preferred. Applying part A as a foam presents several long term benefits. The foam adheres to the wing due to its viscous nature and insulates the wing from moisture condensing onto the wing due to the cold fuel in the aircraft. Due to the very stable nature of the foam it provides a stable foam for a period of up to about six hours. Any precipitation falling contacts the foam and as the moisture works its way through the foam it dissolves the organic antifreeze agents and lowers the freezing point of the water. By the time the moisture reaches the wing itself, it has achieved antifreeze characteristics and will not freeze to the metal.

The dye in the composition is visible to the eye or with the use of ultraviolet light at night. As the moisture falls, the water extracts the dye from the solution and the visibility of the dye decreases as the amount of anti-icing protection decreases. The amount of dye or its color can be calibrated to determine the safe level of protection before ice formation becomes a serious safety hazard.

The invention as it is applied to the parts of aircraft as de-icers and antifreeze is more specifically described in the embodiment in Example 3. All percentages are calculated on a weight percent basis.

Example 3

| Part A | Part B |
|---|---|
| .5% cellulose gum | 99% propylene glycol |
| 2% gelatin | 1% dye |
| 2% lauryl sulfate | |
| 48% propylene glycol | |
| 47.5% water | |

Part A was prepared by heating approximately one liter of water to boiling. About forty grams of gelatin (275 bloom) were added to the boiling water. Before the solution cooled, approximately one liter of propylene glycol was added to the above solution to make a combined volume of approximately two liters. About ten grams of cellulose gum were added to the vigorously stirred solution, noting that the viscosity of the solution increased as the cellulose gum dissolved. This solution was stirred for a period of at least about one hour or until the solution was clear, homogeneous and lump free. Approximately forty grams of previously dissolved lauryl sulfate in water were added to this solution.

The composition was applied with modified Powermate Pressure Wash spray units (Coleman Powermate, Inc., Kearney, Neb.). Part A and part B solutions were placed in five gallon carboys and placed about two feet above the spraying unit to prime and gravity feed the sprayers. Unlike the spraying method utilized above, part B was applied to the surfaces substantially immediately before part A by simply moving the two secured spray wands in a motion so part B went on before part A. Part B was attached to a high pressure unit which dispersed the mixture in a fine mist to uniformly cover the lifting surfaces of the plane to be covered. The propylene glycol antifreeze initially coated the plane immediately prior to foamed part A. The application of component part A occurred at a back pressure of about 1200 psi and a spray rate of about 1 gallon per minute. In addition, the spray from the part A wand was directed through a 90 mesh screen held about two inches in front of the spray tip to produce a fine bubble foam.

The foam was applied to the wings in a thickness range between approximately one inch and approximately two inches.

The material described in Example 3 is also a highly effective release agent to prevent ice build-up, or to facilitate removal of ice, from refrigeration pipes and other surfaces and structures where ice accumulation is undesirable. The material may be applied with or without foaming and any ice accumulation can be readily removed by air spray or mechanical contact.

Example 4

A protective film for exposed structural steel may be prepared as a two part system as follows:

Part A, the vehicle, is prepared, as described in Example 1, as a solution/dispersion containing 3 parts by weight sodium alginate, heavy viscosity (Meer Corporation food grade)

82 parts by weight water 15 parts by weight propylene glycol

Part B, the reactant, is prepared, as described in Example 1, as a solution containing 5 parts by weight calcium chloride 95 parts by weight water Parts A and B are sprayed through a dual head spray applicator as described in Example 1 onto structural steel members, such as flat steel, reinforcing bars and I-beams. The film of coating forms in situ on the steel members and forms a substantially continuous film covering the members. The film will dry and be continuous in about 30 minutes. The steel members and covering film may be left exposed in an outdoor storage yard. The film may be stripped from the steel members and disposed of by flushing with a pressurized water stream. The steel members will be substantially less corroded than an unprotected comparison piece stored under equivalent conditions.

Example 5

A protective film for an exposed composite concrete pier form may be prepared as a two part system as follows:

Part A, the vehicle, may be prepared, as described in Example 1, as a solution/dispersion containing 3 parts by weight high viscosity sodium alginate (Meer Corporation food grade)

90 parts by weight water 7 parts by weight glycerin Part B, the reactant, may be prepared, as described in Example 1, as a solution containing 5 parts by weight calcium chloride 95 parts by weight water Parts A and B are sprayed through a dual head spray applicator, as described in Example 1, onto a tubular composite concrete form of laminated reinforced paperboard. The film of coating forms in situ on the laminated tube and forms a substantially continuous film covering the laminated tube. The film will dry and be continuous in about 30 minutes. The laminated tube and covering film may be left exposed in an outdoor storage yard, for example, for 30 days. At the end of that time the film may be stripped from the laminated tube and disposed of by flushing with pressurized water or by scraping. The laminated tube will be in substantially better condition than an unprotected comparison piece stored under the same conditions. The protected piece will not exhibit any substantial delamination or degradation from absorbed moisture. The unprotected piece will suffer environmental degradation.

Example 6

A protective film for exposed particulate material may be prepared as a two part system as follows:

Part A, the vehicle, may be prepared, as described in Example 1, as a solution/dispersion containing 3 parts by weight sodium alginate (high viscosity) Meer Corporation food grade 90 parts by weight water 7 parts by weight glycerin Part B, the reactant, may be prepared, as described in Example 1, as a solution containing 5 parts by weight calcium chloride 95 parts by weight water Parts A and B are sprayed through a dual head spray applicator, as described in Example 1, onto the surface of a gravel load contained in a truck bed. The film of coating forms in situ on the upper exposed surface of the gravel load and forms a substantially continuous film covering the gravel load and confining the gravel to the vehicle. The film covered load may be subjected to bumps and agitation by driving over surface bumps at speeds consistent with work conditions. The film will retain loose particles in the vehicle. The load may be dumped into storage. The film will not interfere with removal of the load from the vehicle and the load will break up into loose gravel when dumped.

Example 7

A protective film for landfill and pit lining may be prepared as a two part system as follows:

Part A, the vehicle, may be prepared, as described in Example 1, as a solution/dispersion containing 3 parts by weight sodium alginate (heavy viscosity) Meer Corporation food grade 90 parts by weight water 7 parts by weight propylene glycol Part B, the reactant, may be prepared, as described in Example 1, as a solution containing 5 parts by weight calcium chloride 95 parts by weight water Parts A and B are sprayed through a dual head spray applicator as described in Example 1 onto a landfill pit to line the bottom and walls of the pit with a thick flexible film. The film of coating forms in situ on the bottom and walls of the pit and forms a substantially continuous film. The pit may be subsequently filled with compacted landfill refuse and a covering film applied by spraying, as described herein. The pit may then be covered with a compacted earth overburden to seal the pit. The film acts to seal the refuse and retard leaching of the pit contents into the environment.

Example 8

A protective film for lining dry chemical cars, such as those transporting urea or potash, may be prepared as a two part system as follows:

Part A, the vehicle, was prepared, as described in Example 1, as a solution/dispersion containing 2.4 parts by weight sodium alginate (heavy viscosity) Meer Corporation, food grade 87.6 parts by weight water 10 parts by weight glycerin Part B, the reactant, was a dry solid of anhydrous calcium chloride, fine powder.

Part A was sprayed through a spray applicator onto the surfaces of an open railway car. When the surfaces of the car were covered by part A, a dusting of the powdered calcium chloride was applied to lightly cover the tacky film of part A. The film was dry and continuous in about 30 minutes.

Thus there has been shown and described novel means for environmentally sound antifreeze and covering compositions and uses without ethylene glycol or alkaline earth halides. The present invention fulfills all the objects and advantages set forth above. It will be apparent to those skilled in the art, however, that many changes, modifications, variations and other uses and applications for the subject invention are possible. All such changes, modifications, variations and other uses and applications which do not depart from the spirit and scope of the invention are deemed to be covered by the invention, which is limited only the claims which follow.

We claim:

1. A method of treating a surface to enable removal of ice accumulation comprising applying a gel film of an antifreeze composition to the surface, the composition being comprised of:

part A comprised of a water containing solution of an alginic acid composition containing acid functional groups, the alginic acid composition being selected from the group consisting of sodium, potassium and ammonium salts of alginic acid, and a separate part B comprised of a water containing solution of a polyvalent cation salt selected from the group consisting of soluble calcium, aluminum and iron salts, the alginic acid composition being present in part A in an amount between about 0.1 to 20% by weight, and the polyvalent cation salt being present in part B in an amount between about 0.001 and 30% by weight, combining part A and part B to form the gel film on the surface, the gel film being releasable from the surface, part A and part B being effective to form the releasable gel film on the surface preventing ice from adhering to the surface and permitting ready removal of ice from the surface, and exposing the surface to ice accumulation.

2. The method of claim 1 wherein part A contains a gelatinous material.

3. The method of claim 1 wherein the protected surface is an aircraft surface.

4. The method of claim 1 wherein the antifreeze composition is applied by spraying part A and part B with pressurized spray units having a flow rate of between about 0.2 gallons per minute and 0.8 gallons per minute and forming a gel layer on the surface, the gel layer being between about 0.001 and 0.250 inches in thickness.

5. The method of claim 1 wherein part B is applied prior to part A.

6. The method of claim 1 wherein part A is applied as a foam.

7. A method of protecting an aircraft surface from ice accumulation comprising applying an antifreeze composition to the aircraft surface, the composition comprising:

part A comprised of a water containing solution of an alginic acid composition containing acid functional groups, the alginic acid composition being selected from the group consisting of sodium, potassium and ammonium salts of alginic acid, and a separate part B comprised of a water containing solution of a polyvalent cation salt selected from the group consisting of soluble calcium, aluminum and iron salts, the alginic acid composition being present in part A in an amount between about 0.1 to 20% by weight, and the polyvalent cation salt being present in part B in an amount between about 0.001 and 30% by weight, combining part A and part B to form the gel film on the surface, the gel film being releasable from the surface, part A and part B being effective to form a releasable gel film on the aircraft surface preventing ice from adhering to the surface and permitting ready removal of ice from the surface and exposing the surface to ice accumulation.

8. The method of claim 7 wherein part A contains a gelatinous material.

9. The method of claim 7 wherein the antifreeze composition is applied by spraying part A and part B with pressurized spray units having a flow rate of between about 0.2 gallons per minute and 0.8 gallons per minute and forming a gel layer on the surface, the gel layer being between about 0.001 and 0.250 inches in thickness.

10. The method of claim 7 wherein part B is applied prior to part A.

11. The method of claim 1 wherein part A is applied as a foam.

12. A method of protecting an aircraft surface from ice accumulation comprising applying an antifreeze composition to the aircraft surface, the method comprising:

first spraying a part B component of a water containing solution of a polyvalent cation salt selected from the group consisting of soluble calcium, aluminum and iron salts, to the aircraft surface, then spraying a part A component of a water containing solution of an alginic acid composition containing acid functional groups, the alginic acid composition being selected from the group consisting of sodium, potassium and ammonium salts of alginic acid, to the aircraft surface, the part A component being sprayed as a foam, the alginic acid composition being present in part A in an amount between about 0.1 to 20% by weight, and the polyvalent cation salt being present in part B in an amount between about 0.001 and 30% by weight, combining part A and part B to form the gel film on the surface, the gel film being releasable from the surface, part A and part B being effective to form a releasable film on the aircraft surface preventing ice from adhering to the surface and permitting ready removal of ice from the surface and exposing the surface to ice accumulation.

13. The method of claim 12 wherein part A contains a gelatinous material.

14. The method of claim 12 wherein part A is sprayed through a screen to create the foam.

15. The method of claim 12 wherein the antifreeze composition is applied by spraying part A and part B with pressurized spray units having a flow rate of between about 0.2 gallons per minute and 0.8 gallons per minute and forming a gel layer on the surface, the gel layer being between about 0.001 and 0.250 inches in thickness.

16. The method of claim 12 wherein the foam is sprayed to a thickness between about 0.5 to 4 inches.

17. The method of claim 16 wherein the foam is sprayed to a thickness of between about 1 to 2 inches.

18. A method of protecting a surface from ice accumulation comprising applying an antifreeze composition to the surface, the composition being comprised of:

part A comprised of a water containing solution of an alginic acid composition containing acid functional groups, the alginic acid composition being selected from the group consisting of sodium, potassium and ammonium salts of alginic acid, and a separate part B comprised of a water containing solution of a polyvalent cation salt selected from the group consisting of soluble calcium, aluminum and iron salts, the alginic acid composition being present in part A in an amount between about 0.1 to 20 % by weight, and the polyvalent cation salt being present in part B in an amount between about 0.001 and 30% by weight, combining part A and B to form the gel film on the surface, the gel film being releasable from the surface, part A and part B being effective to form a releasable gel film on the surface preventing ice from adhering to the surface and permitting ready removal of ice from the surface, at least one of part A and part B containing a corrosion inhibitor selected from the group consisting of calcium carbonate, magnesium carbonate and dolomite and exposing the surface to ice accumulation.

* * * * *